Jan. 27, 1931.  G. W. TAYLOR  1,790,253
CRANK SHAFT AND BEARING ASSEMBLY
Filed Feb. 9, 1927   3 Sheets-Sheet 1
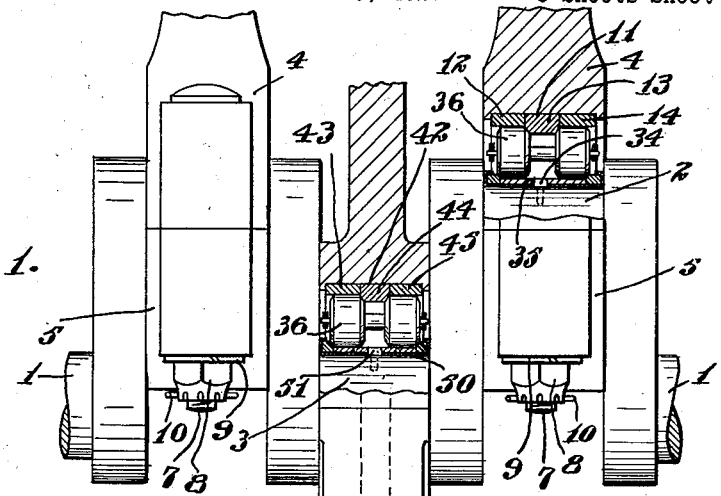

Jan. 27, 1931.  G. W. TAYLOR  1,790,253
CRANK SHAFT AND BEARING ASSEMBLY
Filed Feb. 9, 1927   3 Sheets-Sheet 2
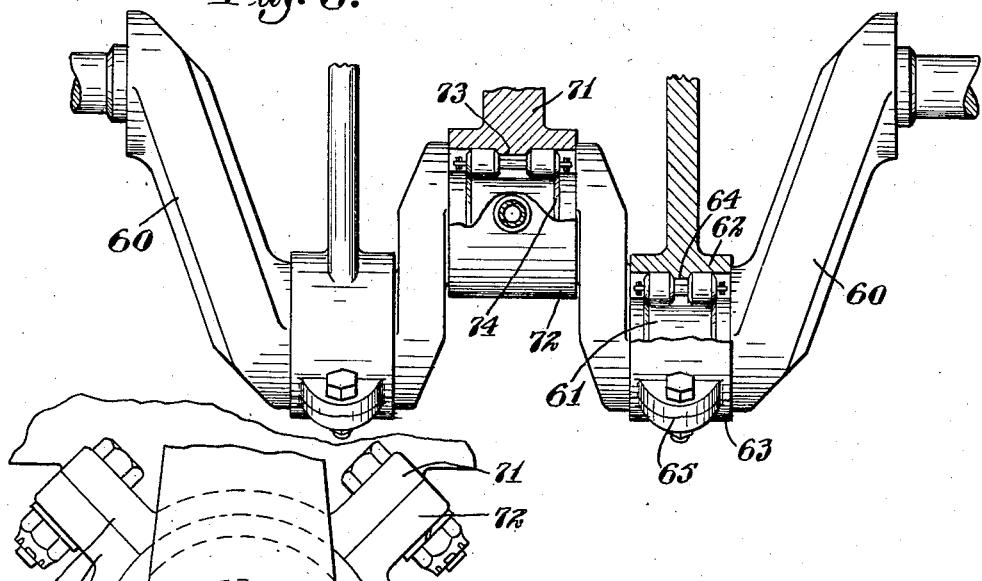
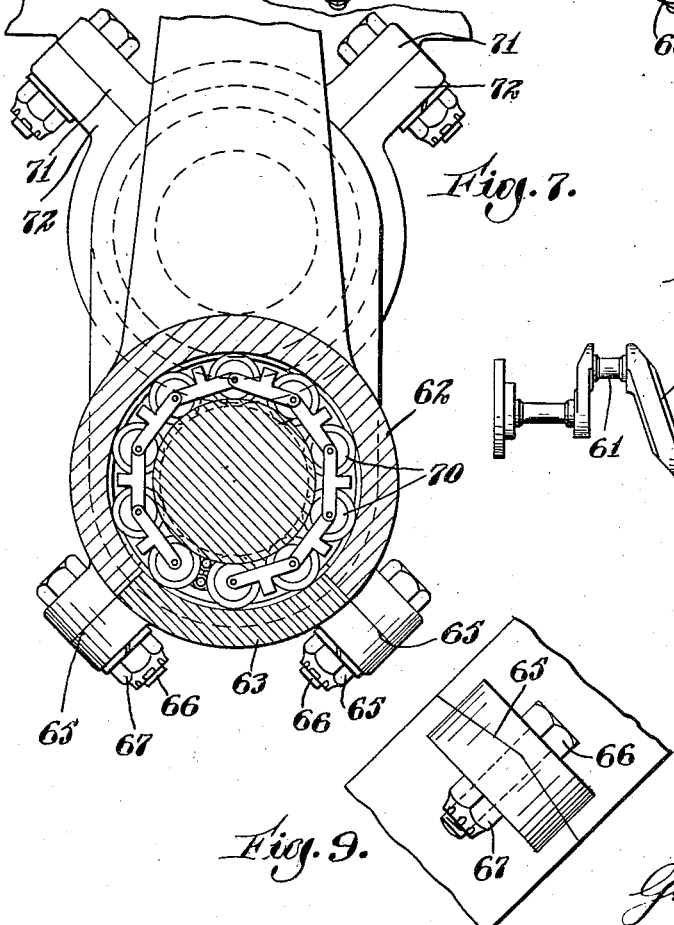
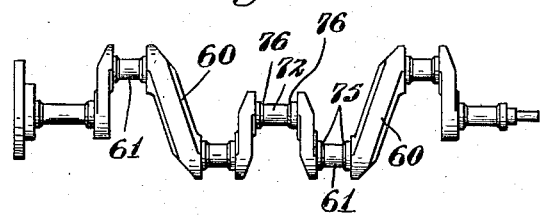
Inventor
George W. Taylor
by Harold J. Clark
Attorney Jan. 27, 1931.  G. W. TAYLOR  1,790,253
CRANK SHAFT AND BEARING ASSEMBLY
Filed Feb. 9, 1927   3 Sheets-Sheet 3
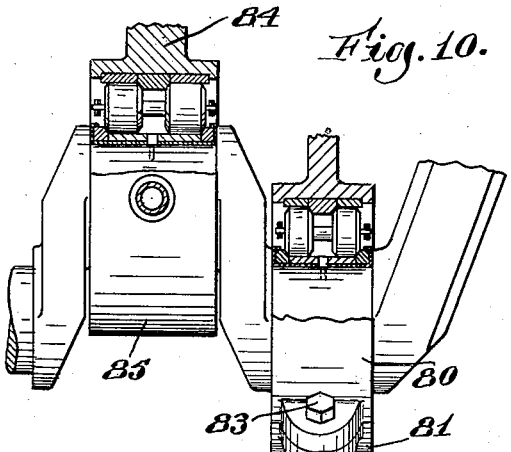
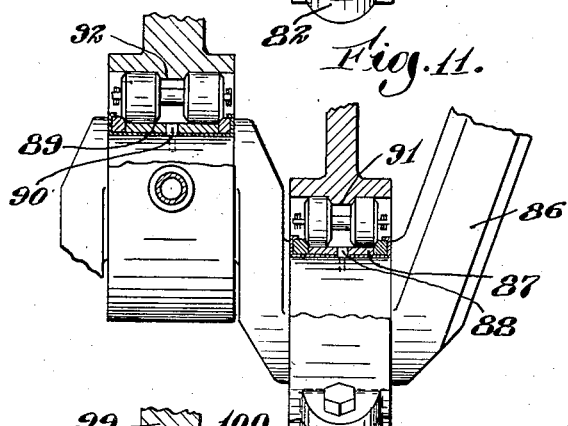
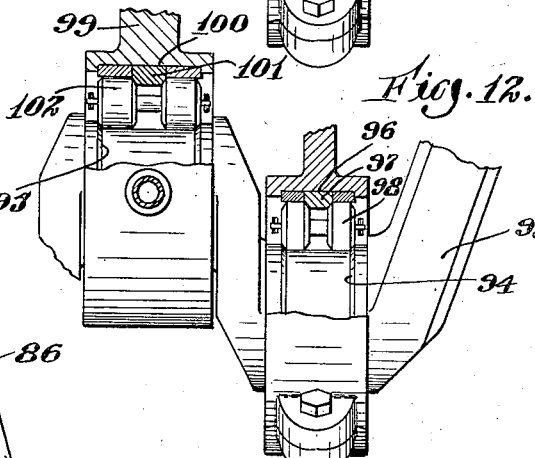
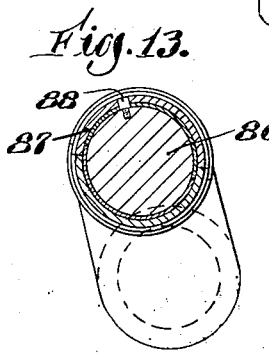
Inventor
George W. Taylor
by Harold F. Clark
Attorney Patented Jan. 27, 1931

1,790,253

UNITED STATES PATENT OFFICE

GEORGE W. TAYLOR, OF WELLESLEY, MASSACHUSETTS, ASSIGNOR, BY MESNE ASSIGNMENTS, TO HAROLD J. CLARK, OF WATERTOWN, MASSACHUSETTS

CRANK-SHAFT AND BEARING ASSEMBLY

Application filed February 9, 1927. Serial No. 166,890.

My present invention relates to shafts and bearings therefor, and more particularly to crank shafts adapted for use in internal combustion engines.

The bearing points of crank shafts of internal combustion engines are invariably supported, and rotated, in plain bearings, it having been heretofore deemed difficult, if not impossible, to provide an anti-friction bearing for use at the bearing points of such crank shafts, viz., the main bearings and connecting rod bearings. The principal reason why anti-friction bearings have not been deemed feasible for this application is because crank shaft bearings, both main and connecting rod, have to be split into an upper and a lower half, in order that the various parts may be disassembled, for replacing, repairs, overhauling, or the like. So far as I am aware, no practicable anti-friction bearing which could be thus split for application to the bearing points of crank shafts, has ever been developed, until the advent of the novel form of split bearing illustrated, described and claimed in my co-pending application Serial No. 165,619, filed Feb. 3, 1927. As illustrated in said co-pending application, I have devised an entirely novel roller bearing, which can be separated for application to line shafting or other installations where the inaccessibility of the bearing point renders the use of an annular bearing impractical, and in many instances such as for a crank shaft of an internal combustion engine, impossible. The application or utilization of my novel split roller bearings to crank shafts results in a great saving in the expense of lubrication, a roller bearing of the type illustrated in my said co-pending application consuming much less lubricant than a plain bearing, which reduction in lubricant is made possible by the reduction in heat and friction in my novel bearing.

Such a roller bearing will also reduce, if not eliminate, many crank shaft and bearing troubles heretofore existent, such as burned out and worn bearings, knocks incident thereto, and the like. By the use of my novel bearing in the crank shaft of an engine, the efficiency of the engine will be greatly increased, because of the fact that less power will be required to rotate the crank shaft, since, instead of a sliding friction at the bearing points, I have substituted pure rolling contact, and hence substantially the full power of the engine is transmitted to the driving devices of the car, with the resultant advantages incident thereto. This roller bearing construction will also be of great advantage in cold weather, the roller bearings of the type illustrated herein presenting greatly reduced resistance to the rotation of the crank shaft therein, resulting in quicker and easier starting of the engine, resultant reduction of damage to the working parts of the engine, and will also result in reducing the strain on the battery and starter. With present plain bearings the film of oil becomes congealed between the bearing surfaces, requiring excessive power to start the engine, which difficulties and disadvantages are overcome by my present invention.

In applying my novel roller bearing to the crank shaft bearings, I construct the outer sleeve or race in such manner that the impact or force of the explosion or expansion will be received, in the bearing, throughout an unbroken metallic surface, the line of separation in the outer sleeve occurring at the bottom of the bearing. Since, in the connecting rod bearings, much less strength is required on the upstroke than on the down or power stroke, my novel crank shaft and bearing construction in the connecting rod bearings is equally as efficient as an annular bearing. In the main bearings, which are not subjected to as great strains and impacts as the connecting rod bearings, I prefer to form the sections of the housings and races, both inner and outer, in substantially equal halves, this construction also serving for simpler application in an engine, since the upper half of the main bearing housing is usually fixed to or formed as a part of the crank shaft casing.

Preferably also, I form the bearing races, both inner and outer, at their abutting joints, as shown in my said co-pending application Serial No. 165,619 filed Feb. 3, 1927. With the races formed in this manner, viz., joining on diagonal lines, a continuous and substantially uninterrupted bearing surface is provided, so that at no point during the passage of the rollers over the races will the rollers encounter a full break or joint, the roller passing over the line of separation or joint.

In the present application I have illustrated several methods or modifications of applying my novel roller bearing to crank shaft construction, and these various methods will be hereinafter more fully described.

I believe that my invention of a crank shaft, mounted throughout at all bearing points, in anti-friction bearings, is novel, and I have therefore claimed the same broadly herein.

Further features of the invention, novel combinations of parts, details and advantages, will be hereinafter more fully pointed out and claimed.

Referring to the drawings, illustrating preferred embodiments of the present invention, Fig. 1 is a side elevation, partly in section, of a crank shaft mounted in my novel bearings;

Fig. 2 is an end elevation of the structure of Fig. 1;

Fig. 3 is a separated view of the connecting rod housings and outer race sections;

Fig. 4 is a separated view of the joint or union between the inner race sections;

Fig. 5 is a similar view of the outer race sections;

Fig. 6 is a side elevation, partly in section, of a crank shaft with a modified form of bearing assembly;

Fig. 7 is an end elevation, partly in section, of the structure of Fig. 6;

Fig. 8 is a side elevation of a crank shaft having the inner bearing races formed or constructed integral therewith;

Fig. 9 is a plan view of the joint between the housing sections;

Fig. 10 is a side elevation partly in section of a further modification;

Fig. 11 is a side elevation partly in section of a further form of structure;

Fig. 12 is a side elevation partly in section of another form of bearing application; and Fig. 13 is a cross sectional detail illustrating the inner ring and the means for securing the inner ring against rotation on the crank shaft.

As shown in the drawings, in Figs. 1 to 5 inclusive, illustrating the preferred form of my present invention, 1 designates generally a crank shaft of the type utilized in internal combustion engines. It will be appreciated that the construction herein illustrated is applicable to the crank shaft of any form of engine, such as automobile engines, Diesel engines, steam engines or the like, the construction illustrated herein being that of an internal combustion engine crank shaft utilized in motor vehicles. However, this is for illustrative purposes only, but the principles of application will be the same regardless of the type of engine to which the invention is applied. The crank shaft 1 has a plurality of bearing surfaces 2 and 3, those illustrated at 2 being the bearing portion of the crank shaft mounted in the connecting rod bearing housing, and those illustrated at 3 being the bearing portions mounted in the main bearing housings. As is usual, the connecting rod bearing housing is separated into an upper half or section 4 and a lower half or section 5 divided or separated approximately at the point illustrated at 6. When in assembled formation the two sections of the connecting rod bearing housing are united by means of bolts 7, passing through both sections, and being secured in place by means of nuts 8 having lock washers 9 interposed between the nut 8 and section 5, and also with the usual cotter pins 10 passing through the bolt 7 and the usual castellations on the nut 8. The structure thus far defined is usual crank shaft and bearing housing construction for the connecting rod. In applying my invention thereto, I channel the housing sections 4 and 5 at 11. In the upper section 4 are seated or fitted portions of rings 12, 13 and 14. As clearly illustrated in Fig. 3, these portions 12, 13 and 14 extend throughout approximately three quarters of a complete circle. In the lower section 5 are also fitted ring sections here illustrated generally at 15, which ring sections occupy the remainder of the circumferential distance left open by the three quarter rings 12, 13 and 14. When in assembled position the ring sections in the lower housing 5 mesh with the ring sections in the housing 4 in such manner as to form a continuous bearing surface, and in this joined or meshed condition constitute an outer bearing race. In Fig. 5 is illustrated the method in which the contacting or abutting ends of the race portions are formed. The ring portions 12 and 14 are provided with slanting faces 16 and 17 respectively, and the ring portions 18 and 19 are provided with angled faces 20 and 21 respectively. The ring portion 13 has a face or end 22 which is cut straight, and the ring portion 23 has a corresponding straight edge or end 24. Thus, as will be readily seen when the ring sections are united, the angled or diagonal ends 16 and 20, and 17 and 21 will meet in such manner that the anti-friction devices passing thereover will be uninterrupted in their passage. The inner race or sleeve, which is adapted to fit snugly around the bearing operation of the crank shaft, comprises two substantially identical portions, and is composed in the upper half, of ring portions 25, 26 and 27. The lower section is comprised of rings 28, 29 and 30. The abutting ends of the ring sections 26, 27, 29 and 30 are formed straight across, while the ring sections 25 and 28 are provided with diagonal abutting edges 31 and 32, as the ring portions 25 and 26 constitute the rolling surface over which the anti-friction media pass. To secure the ring portions of the inner sleeve in close contact, I provide an enclosing or retaining sleeve or cap 33, split into two substantially identical sections. This cap extends over the inside of the rings, up and over the outer and top edges of the outside race ring section, firmly clamping and retaining these sections in united position. The ends of the cap 33 extend beyond the line of separation of the inner race ring sections at one side of each half, and do not extend to the line of separation on the opposite side. In this manner the line of joint between the cap sections is offset from the line of joint of the inner race ring sections, resulting in a more substantial structure. In applying my novel invention to the connecting rod bearing portion, the inner race ring sections are fitted around the bearing surface 2, and are held against rotation or sliding on said bearing surface by means of a stud 34 threaded or otherwise secured in the bearing portion 2. A suitable recess is provided in one of the inner race sections, and when applied to the bearing surface 2 the stud 34 will enter the recess 35, thus effectually preventing slippage or rotation of the inner race ring around the bearing surface. In assembling the connecting rod on the crank shaft according to my present invention the inner race sections are first assembled around the bearing surface 2; the connecting rod with its upper housing portion 4 and three quarter race ring sections 12, 13, 14 is then positioned in approximately final position over the inner race sections and crank shaft. Between the complete inner race and the three quarter outer race I then insert a series of anti-friction media. Preferably I utilize such series or chain of anti-friction rollers as illustrated in detail in my prior and co-pending application, Serial No. 165,619, filed Feb. 3, 1927. The roller series, as clearly and completely described in my said co-pending application, comprise a plurality of main supporting rollers 36. Interposed between each pair of main supporting rollers is a pair of separating rollers 37, contained within a retaining ring 38. Each pair of supporting rollers and its separating rollers is united by a pivotally mounted connecting and retaining link 39, with the exception of the two end main rollers of the chain. The chain of rollers being fed between the inner and outer races as thus far assembled, the last unit of separating rollers and their retaining ring, here designated as 37 and 38, is snapped or sprung into place, and the entire roller unit rotated around the race until the last separating unit is above the line of separation. Thereupon, the lower housing section 5 with the quarter section of outer race rings therein is positioned over the bottom of the bearing portion 2 and inner race ring, and secured in place as heretofore described. When thus assembled in final position, the abutting ends of the inner and outer race sections meet in close contact, providing continuous bearing surfaces on each of the inner and outer races, and resulting in a roller bearing which will function with equal efficiency to an annular roller bearing. The construction of the rollers 36, 37, rings 38, and retaining links or clips 39, is substantially the same as described in my said co-pending application, and I have not, therefore, described these rollers in detail herein, referring to said co-pending application for a full and complete description thereof. The rollers and their races have the same thrust and shock absorbing abilities and features as described in said co-pending application, and result in an extremely efficient anti-friction bearing for the installation as thus far described.

It will be appreciated that the construction above described is best adapted for the connecting rod bearings. The connecting rod bearings, of course, are subjected to the constant impacts and blows caused by the explosions in the combustion chamber, and in the construction herein described wherein approximately three quarters of the outer race is on the sides and top of the bearing race, an unbroken metallic surface is presented to the shocks and blows transmitted thereto, on the down stroke of the piston and connecting rod. On the upstroke there is not required the same amount of strength and rigidity in the bearing races, and hence the quarter sections of the outer race in the lower housing, will stand the slight strains incident to the raising of the piston.

The application of my invention to the main bearing of a crank shaft will be similar in many respects to the application to the connecting rod bearings, but, due to the structure of the main bearing housings, some slight changes must be present. For example, the bearing housing portion 40 is generally formed as a part of a web or frame 41, which web or frame is usually cast as an integral part of the engine housing. In this upper housing section 40 I provide a channel 42 similar to the channel 11 in the connecting rod housing, and in this channel are seated a plurality of outer race rings 43, 44 and 45. These race rings are separated longitudinally in substantially identical sections, the upper half of the outer race being designated generally at 46, and the lower half being designated generally at 47 in the lower main bearing housing 48. The series or chain of antifriction rollers is designated generally at 49. The application of the chain of rollers 49 to the main bearings is as described for the connecting rod bearing. The inner sleeve or race is divided into two substantially identical parts 50 and 51, being preferably identical with the inner sleeve or race described for the connecting rod bearings. The inner race is fitted about the bearing surface 3 of the main bearing and held against rotation by the stud 51, all as previously described for the connecting rod bearings. On the main bearings, the usual oil lead 52 is provided. However, as clearly shown, the housings, both main and connecting rod, are separated from the crank shaft webs a sufficient distance so that lubrication of the bearings will be substantially taken care of by the splash and spray. The lower main bearing housing 48 is secured to the upper housing section by bolts 53, lock washers 54 and castellated nuts 55.

It will be appreciated that the bearing construction illustrated herein will require greatly less lubricant than the present type of plain bearings, resulting in a great saving of lubrication expense.

It will also be appreciated that wear on the bearing portions of the crank shaft, both main and connecting rod bearings, is reduced to a minimum, resulting in longer life of the engine, more efficient running, and consequent reduction in expense of upkeep.

I believe that this crank shaft and bearing assembly is novel, and I have therefore claimed the same broadly herein.

In Figs. 6 to 9 I have illustrated a modification of the crank shaft and bearing assembly. In this form the crank shaft 60 has the inner race for the connecting rod bearing formed directly therein as illustrated at 61, and the connecting rod housing sections 62 and 63 have the outer race formed as an integral part of said housing sections, as shown at 64. The connecting rod housing sections 62 and 63 are separated or split in the proportion of three quarters to one quarter, with the three quarter surface uppermost, thus presenting an unbroken metallic surface to the shocks imparted to the connecting rod. The housing sections 62 and 63 are separated on the lines 65, 65, and secured together by bolts 66 and nuts 67. The line of separation 65 is preferably diagonal, as illustrated in Fig. 9, so that the rollers 70 will not strike the line of separation at any one interval, but will pass gradually thereover. The structure of rollers, separating rollers and retaining links is identical with those illustrated in Figs. 1 to 5 inclusive. The main bearing housing sections 71 and 72 have the outer race formed integrally therewith, as illustrated at 73, and the crank shaft at the main bearing portion has the inner race formed integrally therewith as illustrated at 74. The main bearing is constructed with the three quarter section 72 of the housing downward and the quarter section 71 upward, since the weight of the crank shaft exerts downward pressure, and hence this form of construction presents a three quarter unbroken surface to the sides and bottom of the main bearing housing in which the crank shaft rests.

Fig. 8 illustrates very clearly the method of forming the inner races integrally with the crank shaft wherein the surfaces 61 and 72 are ground or formed smooth and flush to provide an even rolling surface for the rollers 70. These surfaces are bevelled adjacent their ends at 75 on the connecting rod bearing portions and 76 on the main bearing portions, to cooperate with corresponding bevels on the ends of the rollers 70. The outer races 64 and 73 are formed or ground directly into the housing portions 62 and 71, having a bevelled rib to cooperate with corresponding intermediate bevels on the rolls.

This form of construction is simple of manufacture, and very efficient in operation, and I have also claimed this form of bearing construction herein.

The construction illustrated in Fig. 10 is the same as that illustrated in Figs. 1 to 5 inclusive, with the exception that the connecting rod bearing housing sections 80 and 81 are divided into unequal sections, approximately three quarters to one quarter, the three quarter section being on the top and sides. These two sections are united along a diagonal line of separation 82 and secured together by bolts or the like 83. The main bearing housing sections 84 and 85 are divided on the same proportions as the connecting rod housings, except that the three quarter section of the main bearing housing, viz., 85 is at the bottom and sides of the bearing, to offset the weight of the crank shaft and receive the same by an unbroken metallic surface. Otherwise, the construction of Fig. 10 is similar to that shown in Figs. 1 to 5 inclusive.

Fig. 11 represents a slight modification wherein the crank shaft 86 has at its connecting rod bearing point an inner race 87 therearound, secured against rotation or slippage by a stud 88. The main bearing portion of the crank shaft has an inner race or sleeve 89 secured against rotation thereon by a stud 90. The form of inner sleeve or race is identical with that of Figs. 1 to 5 and Fig.

10, the only variation between the form of Fig. 11 and that of Fig. 10 being that, instead of having a separate outer race fitted in the connecting rod housings, an outer bevelled race 91 is formed directly on the connecting rod housing, and on the main bearing housing an outer bevelled race 92 is formed integrally therewith. This modification is equally as applicable and efficient as the other forms illustrated herein, presenting merely a change in the manufacturing and assembling of the bearings and housings.

Fig. 12 illustrates a construction embodying all of the advantageous features hereinbefore pointed out but reversing the race construction of Fig. 11. In Fig. 12 the crank shaft 13 has an inner bevelled race 94 formed directly therein at the connecting rod bearing point, and an inner bevelled race 95 formed integrally therewith at the main bearing point. In a channel 96 formed in the connecting rod is an outer race designated generally at 97, composed of a plurality of rings identical with those described in Fig. 1. Between the races 94 and 97 work a series of rollers 98 identical with those heretofore described. The main bearing housing 99 is formed with a channel 100, and has an outer multi-part race 101 fitted therein, similar to the race 97. Between the races 95 and 101 work a series of supporting rollers 102, similar to the rollers 98.

Each of the forms of bearing assemblies illustrated in Figs. 10 to 12 inclusive are within the province of the present invention, the slight variations illustrated all being feasible and not departing from the principle of my invention.

Fig. 13 illustrates in cross sectional detail the relative locations of the inner race 87 on the crank shaft 86 and of the stud 88 holding said inner race against rotation.

I believe that I have devised an entirely novel bearing construction, both main and connecting rod, for crank shafts of internal combustion engines and the like, and I have therefore claimed the same broadly herein.

While I have necessarily described my present invention somewhat in detail, it will be appreciated that I may vary the size, shape and arrangement of parts, within reasonably wide limits, without departing from the spirit of the invention.

My invention is further described and defined in the form of claims as follows:

1. The combination with a shaft, of a raceway thereon, an outer raceway concentrically arranged with respect to the first said raceway and defining with said raceway an annular chamber, a plurality of anti-friction members located within said chamber and engaging said raceways, said outer raceway comprising two unequal portions, the portion of greater length being positioned on that side of the crankshaft which is subjected to the greatest forces, and means to permit removal of the lesser portion to permit entrance of the anti-friction members to the annular chamber.

2. The combination with a shaft, of a removable raceway mounted thereon, means to prevent rotation of said raceway about said shaft, an outer raceway concentrically arranged with respect to said shaft and spaced apart from the first said raceway and defining with said raceway an annular chamber, a plurality of anti-friction members arranged as a flexible unit located within said chamber and engaging with the raceways, the outer raceway comprising two members of unequal length, the portion of greater length being positioned on that side of the crankshaft which is subjected to the greatest forces.

3. The combination with a shaft, of a raceway mounted thereon, an outer raceway concentrically arranged with respect to the first said raceway and defining therewith an annular chamber, a plurality of anti-friction members located within said chamber and engaging said raceways, said outer raceway comprising two unequal portions, and a connecting rod having separable sections constituting an enclosure for the outer raceway so arranged as to permit removal of the lesser portion of said outer raceway to permit said anti-friction members to be inserted in and removed from said annular chamber, the distance between the ends of the larger portion of the outer raceway being substantially equal to the outer diameter of the inner race, the separable sections of said connecting rod being also of unequal dimensions, the connecting rod section of greater length and the outer race portion of greater length being each positioned on the upper surface of said crankshaft, whereby the power impulses imparted to said connecting rod will be received on an unbroken surface.

4. The combination with a crankshaft having main and connecting rod crankpins thereon, of raceways on said pins, outer raceways concentrically arranged with respect to said first raceways and defining therewith annular chambers, a plurality of anti-friction members located within each chamber and engaging said raceways, said outer raceways each comprising two unequal portions, connecting rods each having separable sections of unequal length constituting enclosures for their respective outer raceways, and housing sections of unequal length constituting enclosures for the outer raceways of each main bearing, the distance between the ends of the larger portions of the outer raceways and of the larger sections of their respective enclosures being substantially equal to the outer diameter of the inner raceways, the connecting rod sections of greater length and their respective enclosed outer race portions of greater length being positioned on the upper surface of said crankshaft, and the main bearing housing sections of greater length and their respective enclosed outer raceway portions of greater length being positioned on the under surface of said crankshaft, whereby power impulses imparted to said connecting rods and said main bearing housings will be received on unbroken surfaces.

In testimony whereof, I have signed my name to this specification.

GEORGE W. TAYLOR.